US008672309B2

(12) United States Patent
Birkhauser et al.

(10) Patent No.: US 8,672,309 B2
(45) Date of Patent: Mar. 18, 2014

(54) WINDSHIELD INSTALLATION DEVICE AND METHOD OF USE

(75) Inventors: Robert Birkhauser, Madison, WI (US); Robert Howery, Madison, WI (US)

(73) Assignee: Aegis Tools International, Inc., Madison, WI (US)

( * ) Notice: Subject to any disclaimer, the term of this patent is extended or adjusted under 35 U.S.C. 154(b) by 500 days.

(21) Appl. No.: 12/989,358

(22) PCT Filed: Apr. 23, 2008

(86) PCT No.: PCT/US2008/061259
§ 371 (c)(1),
(2), (4) Date: Dec. 10, 2010

(87) PCT Pub. No.: WO2009/131576
PCT Pub. Date: Oct. 29, 2009

(65) Prior Publication Data
US 2011/0089619 A1    Apr. 21, 2011

(51) Int. Cl.
*B23Q 11/00*    (2006.01)
*B25B 11/00*    (2006.01)
(52) U.S. Cl.
USPC ................................................ 269/22; 269/21
(58) Field of Classification Search
USPC .................. 269/22, 21, 95, 143, 249, 909; 29/281.1, 559, 468, 270, 281.5
See application file for complete search history.

(56) References Cited

U.S. PATENT DOCUMENTS

| | | | |
|---|---|---|---|
| 3,020,017 A | 2/1962 | Watson | |
| 3,620,524 A | 11/1971 | Czompi | |
| 4,231,501 A * | 11/1980 | Goode | 224/546 |
| 4,453,303 A | 6/1984 | Leddet | |
| 4,670,974 A | 6/1987 | Antoszewski et al. | |
| 4,828,303 A * | 5/1989 | Soria | 293/128 |
| 4,852,237 A | 8/1989 | Tradt et al. | |
| 4,998,711 A * | 3/1991 | Borg | 269/21 |
| 5,039,050 A * | 8/1991 | Eidschun et al. | 248/279.1 |
| 5,085,415 A | 2/1992 | Shaver | |
| 5,112,092 A | 5/1992 | Pucci | |
| 5,190,604 A | 3/1993 | Shaver | |
| 5,398,602 A * | 3/1995 | Taylor | 101/129 |
| 5,416,965 A | 5/1995 | Mayhugh | |
| 5,429,253 A | 7/1995 | McNett | |

(Continued)

FOREIGN PATENT DOCUMENTS

DE    202004013157    1/2006
EP    2316678    2/2003

(Continued)

OTHER PUBLICATIONS

Office action for Japanese Patent Application No. 2011-506247 dated Jan. 4, 2013.

(Continued)

*Primary Examiner* — Lee D Wilson
(74) *Attorney, Agent, or Firm* — Michael Best & Friedrich LLP

(57) ABSTRACT

A windshield installation device for use by a single technician in replacing a vehicle windshield. The device includes a first assembly attachable to a side window of the vehicle and a second assembly attachable to the windshield to be placed on the vehicle. The second assembly is adapted to couple to the first assembly and pivot with respect to the first assembly.

22 Claims, 9 Drawing Sheets

(56) References Cited

U.S. PATENT DOCUMENTS

| | | | |
|---|---|---|---|
| 5,479,689 A | 1/1996 | Schmit et al. | |
| 5,525,027 A | 6/1996 | Jinno et al. | |
| 5,556,505 A | 9/1996 | Hill | |
| 5,622,093 A | 4/1997 | Hutchins | |
| 5,772,823 A | 6/1998 | Rusch et al. | |
| 5,826,342 A | 10/1998 | Zuro | |
| 5,953,802 A | 9/1999 | Radzio | |
| 6,101,702 A | 8/2000 | Claycomb et al. | |
| 6,237,216 B1 | 5/2001 | Jin | |
| 6,543,117 B1* | 4/2003 | Claycomb et al. | 29/426.4 |
| 6,578,248 B1* | 6/2003 | Boldizar | 29/281.5 |
| 6,584,925 B2 | 7/2003 | Kapsner et al. | |
| 6,616,800 B2* | 9/2003 | Eriksson | 156/714 |
| 7,039,995 B2 | 5/2006 | Thompson | |
| 7,216,411 B1* | 5/2007 | Mayhugh | 29/468 |
| 7,322,092 B2* | 1/2008 | Adas et al. | 29/468 |
| 7,610,666 B2 | 11/2009 | Adas et al. | |
| 7,628,434 B2* | 12/2009 | Bruce et al. | 294/65 |
| 2002/0152598 A1* | 10/2002 | Sarh | 29/418 |
| 2004/0003488 A1* | 1/2004 | Thompson | 29/281.1 |
| 2006/0156533 A1 | 7/2006 | Mayhugh | |
| 2007/0108790 A1 | 5/2007 | Adas et al. | |
| 2007/0119033 A1* | 5/2007 | Gray et al. | 24/478 |
| 2010/0045063 A1 | 2/2010 | Adas et al. | |

FOREIGN PATENT DOCUMENTS

| | | |
|---|---|---|
| EP | 1785300 | 5/2007 |
| EP | 1826044 | 8/2007 |
| EP | 1849634 | 10/2007 |
| FR | 2828826 | 2/2003 |
| FR | 2952023 | 5/2011 |
| GB | 2273517 | 6/1994 |
| JP | H06065577 | 9/1994 |
| JP | 2002503558 | 2/2002 |
| WO | 9942244 | 2/1999 |

OTHER PUBLICATIONS

European Extended Search Report for European Patent Application No. 08746643.9 dated Oct. 7, 2011.

Rosenbaum, Matthew, A., "Ford Econoline Windshield Two-Man Set Gone Solo" from Glasslinks, auto glass Tech Center Knowledge Base, http://glasslinks.com/tips.solo_set.htm, Jun. 11, 2000.

User Review lil-Buddy windshield installation tool, AutoGlass, Sep.-Oct. 2005, p. 30, vol. 16, No. 5.

Lil-Buddy Windshield Installation Tool Operations Manual.

Industry Products Brand New at the Expo, AutoGlass, Jul.-Aug. 2005, p. 56.

eBay Motors buying page for lil-Buddy auto glass windshield installation tool NIB, auction started Sep. 29, 2005.

The Installer Electric Auto Glass Placement Crane brochure by CM Auto Glass, Inc.

The Installer brochure by C & M Auto Glass.

The Installer "Changing the way auto glass is installed" brochure by C M Auto Glass.

The Installer brochure price list by C M Auto Glass.

The Installer IV—An Auto Glass Placement Crane—brochure by C M Auto Glass.

The Installer IV brochure by C M Auto Glass, 3 slightly different brochures.

Positech, The Right Solution for Tough Material Handling Challenges brochure by Columbus McKinnon Corporation.

Innovative Labor Alternative, Inc. product brochure for the X-TRA Hand windshield installation device.

International Search Report and Written Opinion, International Application No. PCT/US2008/061259, dated Dec. 31, 2008.

European Search Report and Opinion, European Patent Application No. 06255392.0, dated Mar. 26, 2008.

European Office Action, European Patent Application No. 06255392.0, dated Jan. 24, 2011.

Lilbuddy Corporation Training DVD for a windshield installation device.

Innovative Labor Alternative, Inc. DVD for a windshield installation device known as the X-TRA Hand.

Office action for Chinese Patent Application No. 200880129647.7 dated Feb. 16, 2013.

Office action for Japanese Patent Application No. 2011-506247 dated Oct. 15, 2013.

Office action from the State Intellectual Property Office of China for Application No. 200880129647.7 dated Sep. 2, 2013 (13 pages) (received by Chinese associate on Sep. 17, 2013).

* cited by examiner

WINDSHIELD INSTALLATION DEVICE AND METHOD OF USE

BACKGROUND

Installing a windshield on an automotive vehicle requires precise placement of the windshield. Given the weight and considerable size of windshields, and the arrangement of most cars, installing a windshield is often a two-person job that requires individuals on both the driver's and passenger's side of the vehicle. Many businesses that provide auto glass repair and replacement provide on site service, in which a service technician or a team of technicians travel to the customer's vehicle for repair or replacement of the windshield wherever the vehicle happens to be located. Providing on site service in this manner provides a high level of convenience to the customer and can be a distinct competitive advantage for glass replacement businesses.

SUMMARY

The present invention provides a windshield installation device comprising a first assembly and a second assembly. The first assembly includes a suction device, a first tubular member connected to the suction device, and a second tubular member having a first portion and a second portion extending substantially perpendicular to the first portion, the first portion having a diameter less than a diameter of the first tubular member, the first portion adapted to slide within the first tubular member. The second assembly includes a suction device, a bracket connected to the suction device, a third tubular member defining a bore and connected to the bracket, the bracket adapted to pivot with respect to the third tubular member, and an elongated rod positioned and adapted to slide within the bore, wherein the elongated rod is adapted to couple to the second portion of the second tubular member of the first assembly.

The present invention also provides a windshield installation device comprising a first assembly and a second assembly. The first assembly includes a suction device, a first tubular member connected to the suction device, and a second tubular member having a first portion and a second portion extending substantially perpendicular to the first portion, the first portion having a diameter less than a diameter of the first tubular member, the first portion adapted to slide within the first tubular member. The second assembly includes a suction device, a bracket connected to the suction device, a third tubular member defining a bore and connected to the bracket, the bracket adapted to pivot with respect to the third tubular member, and an elongated rod positioned and adapted to slide within the bore, wherein the elongated rod is adapted to couple to the second portion of the second tubular member of the first assembly.

The present invention further provides a method of installing a windshield on a vehicle, the vehicle including a windshield opening and a side window. The method comprises the acts of attaching a first assembly to the side window, the first assembly including a suction device, a first tubular member coupled to the suction device, and a substantially L-shaped second tubular member adapted to slide within the first tubular member; attaching a second assembly to the windshield, the second assembly including a second suction device, a third tubular member coupled to the second suction device, and a rod supported by the third tubular member; positioning the rod on the L-shaped second tubular member; positioning the windshield adjacent the windshield opening; and securing the windshield to the windshield opening.

Other aspects of the invention will become apparent by consideration of the detailed description and accompanying drawings.

Figure 1:
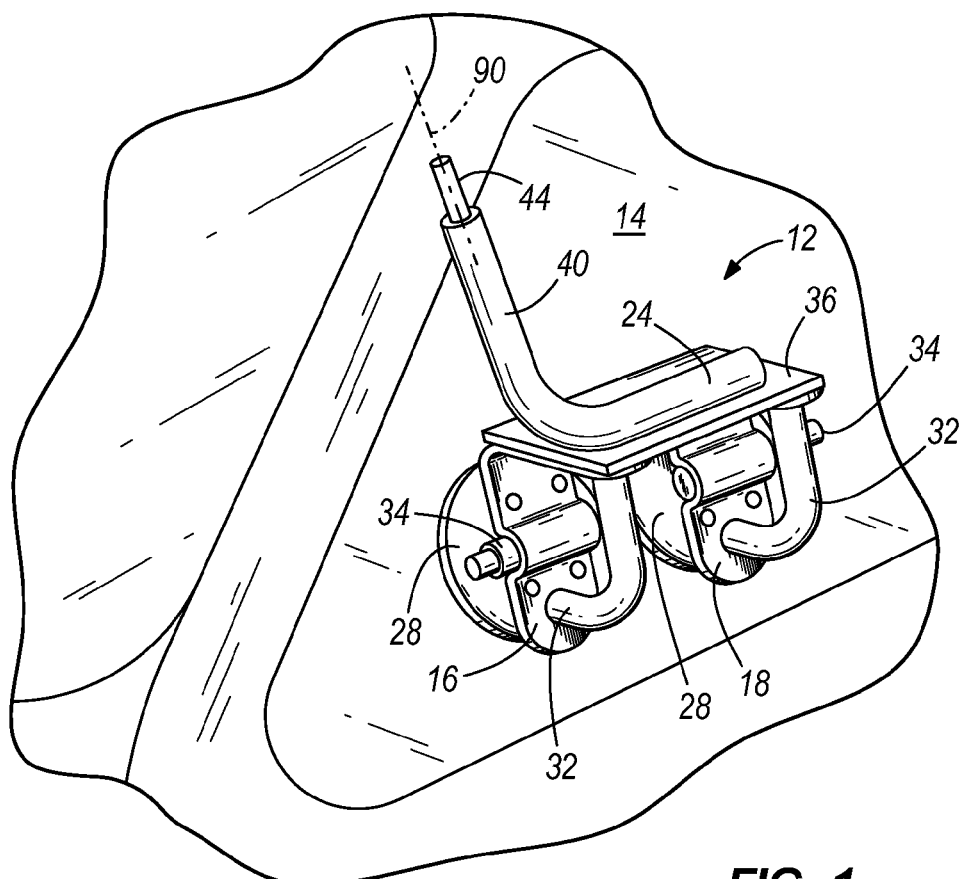
FIG. 1 is a perspective view of a pivot portion of a windshield installation device embodying the invention.
Figure 5:
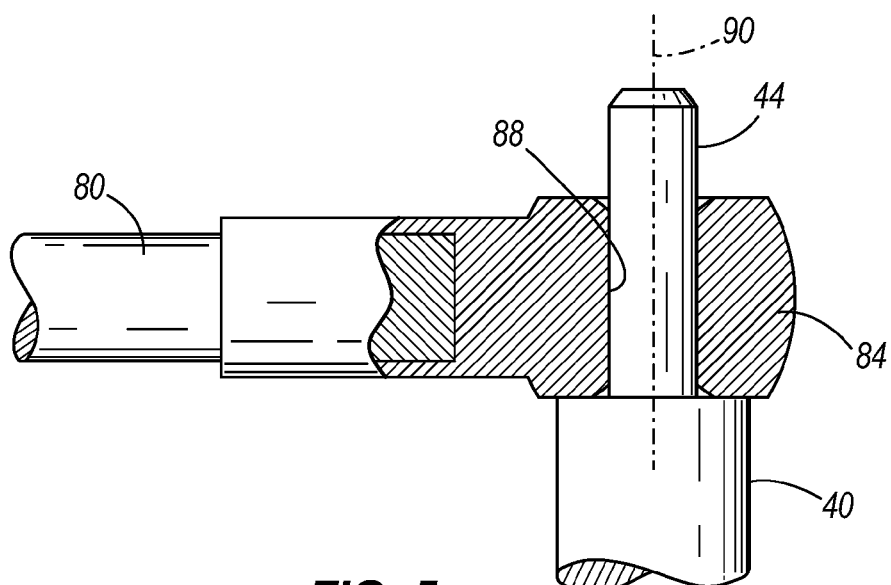
FIG. 5 is a section view taken along line 5-5 of FIG. 4.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-5 illustrate a windshield installation device 10 according to one construction of the present invention. With reference to FIG. 1, the device 10 includes a pivot assembly 12 that attaches to a side window 14 of a vehicle. The pivot assembly 12 includes a first suction device 16, a second suction device 18, and a pivot member 24 coupled to the first and second suction devices 16, 18. Each suction device 16, 18 includes a resilient cup 28, a handle 32 coupled to the cup 28, and a manually actuated vacuum device 34 that removes air from between the cup 28 and a surface to which the suction device is being attached (e.g. the side window 14). The construction of the suction devices 16, 18 and the vacuum device 34 are more fully described in commonly assigned U.S. Pat. No. 5,772,823, the contents of which are incorporated by reference herein. A plate 36 is coupled to the handles 32 and couples the suction devices 16, 18 to one another. The plate 36 can include upturned side edges in some embodiments. The pivot member 24 is substantially L-shaped and includes a first portion that is coupled to the plate 36 and a depending portion 40 that extends away from the plate 36 and which defines a reduced-diameter cylindrical portion 44 at one end. The reduced-diameter cylindrical portion 44 is operable to retract inside of the depending portion 40.

Figure 2:
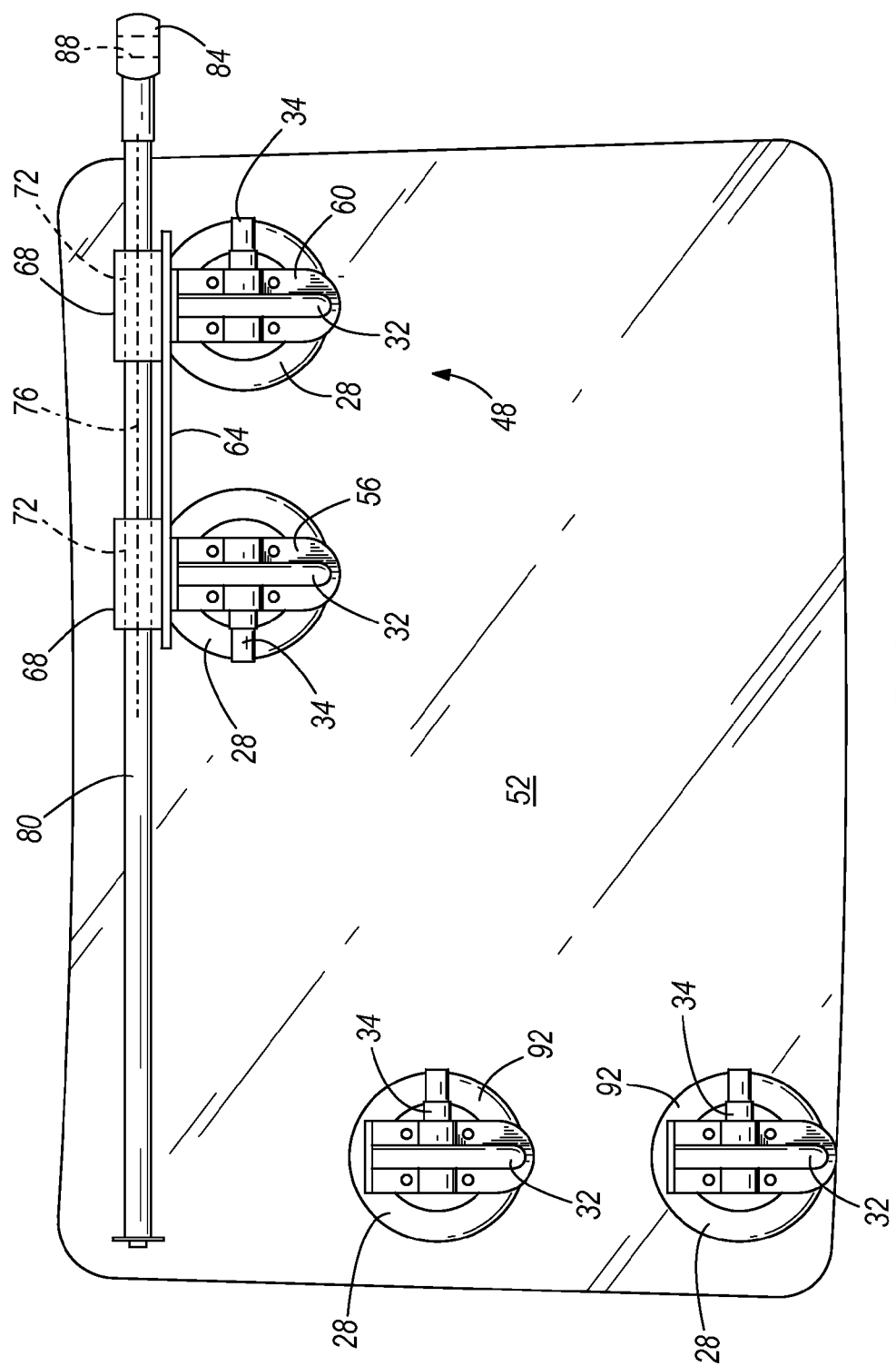
FIG. 2 is a front view of a support portion of the windshield installation device coupled to a windshield.

FIG. 2 illustrates a support assembly 48 of the windshield installation device coupled to a windshield 52 that is to be installed on the vehicle. The support assembly 48 includes a third suction device 56 and a fourth suction device 60, both of which are configured similarly to the first and second suction devices 16, 18. A channel or plate 64 couples the third and fourth suction devices 56, 60 to one another, and support blocks 68 are coupled to the plate 64. The third and fourth suction devices 56, 60 are configured such that a first plane defined by the plate 64 is at an obtuse angle with respect to a second plane defined generally by the windshield 52.

The support blocks 68 each define a bore 72, and the bores 72 are substantially axially aligned with one another and define an axis 76. A generally cylindrical elongated support rod 80 extends through the bores 72 and is both rotatable about the axis 76 and axially moveable with respect to the support blocks 68. The support blocks 68 may include bushings and/or bearings to facilitate smooth sliding and rotation of the support rod 80. The support rod 80 includes an end portion 84 having external threads adapted to receive a connector 86. The connector 86 includes an opening 88 adapted to receive the cylindrical portion 44 of the pivot member 24 (see FIG. 5). The support rod 80 and pivot member 24 are therefore pivotable with respect to one another about an axis 90 defined by the cylindrical portion 44. As illustrated, additional suction devices 92 can be coupled to the windshield 52 to facilitate handling of the windshield 52 during windshield installation.

Figure 3:
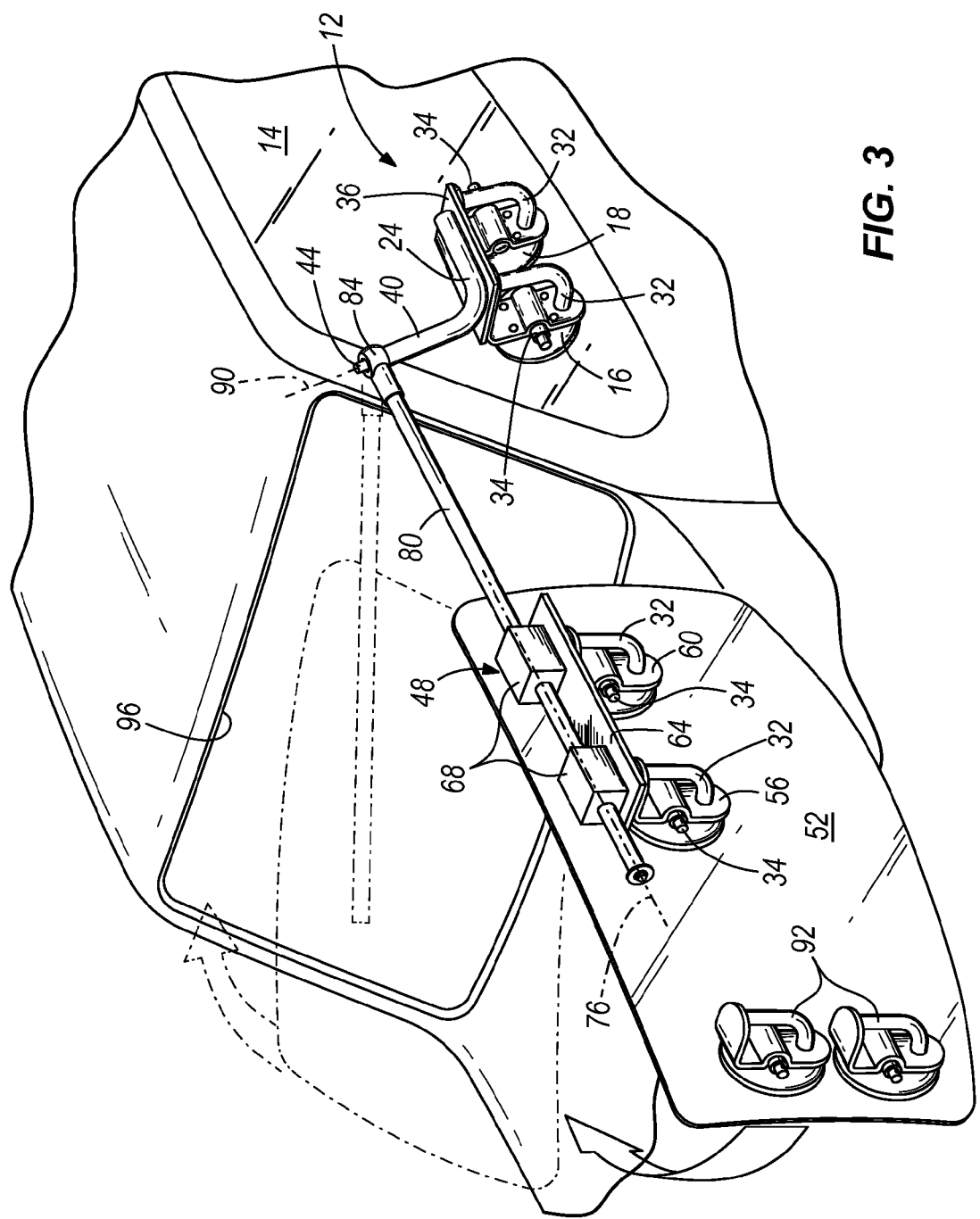
FIG. 3 is a perspective view of the windshield installation device supporting a windshield for installation in a vehicle.
Figure 4:
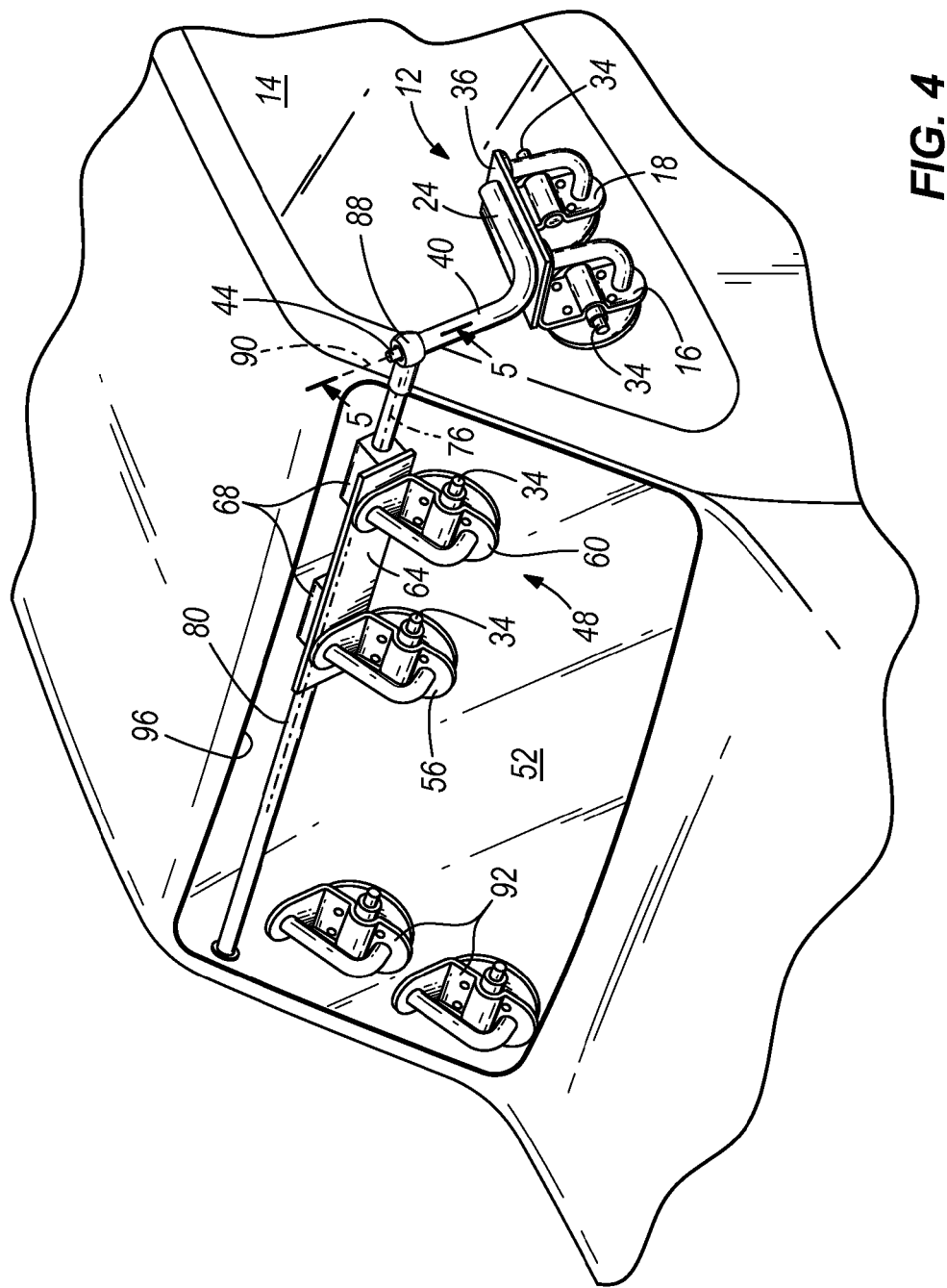
FIG. 4 is a perspective view of the windshield installation device with the windshield positioned for installation in the vehicle.
Figure 6:
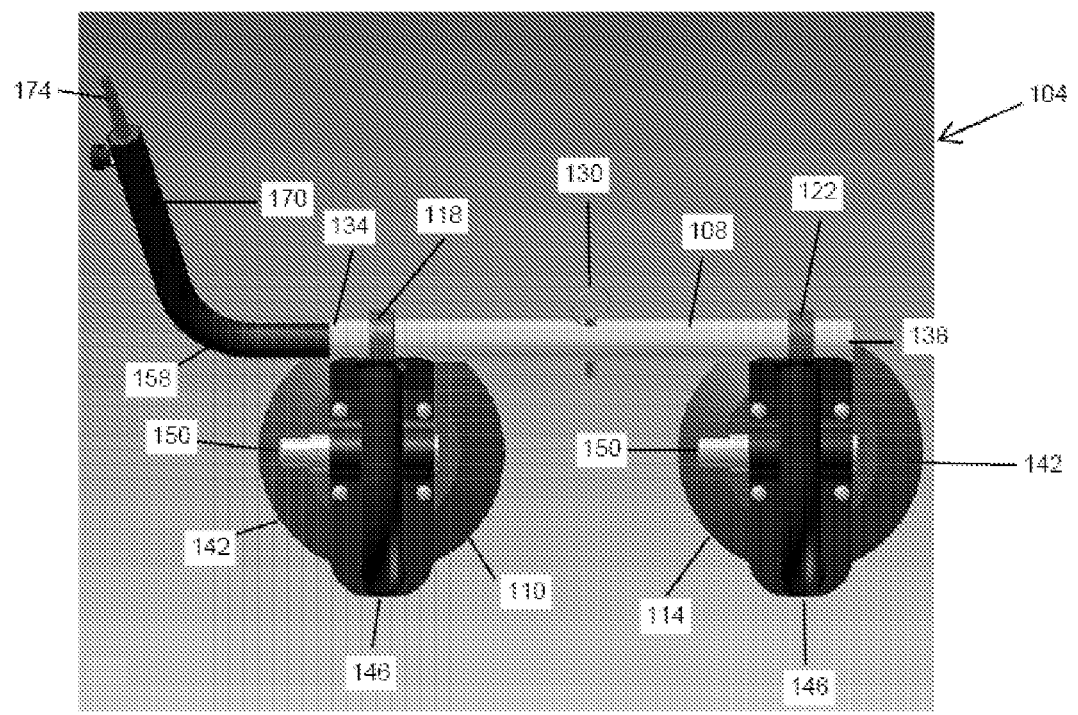
FIG. 6 is a front view of a first assembly of a windshield installation device embodying the invention.
Figure 7:
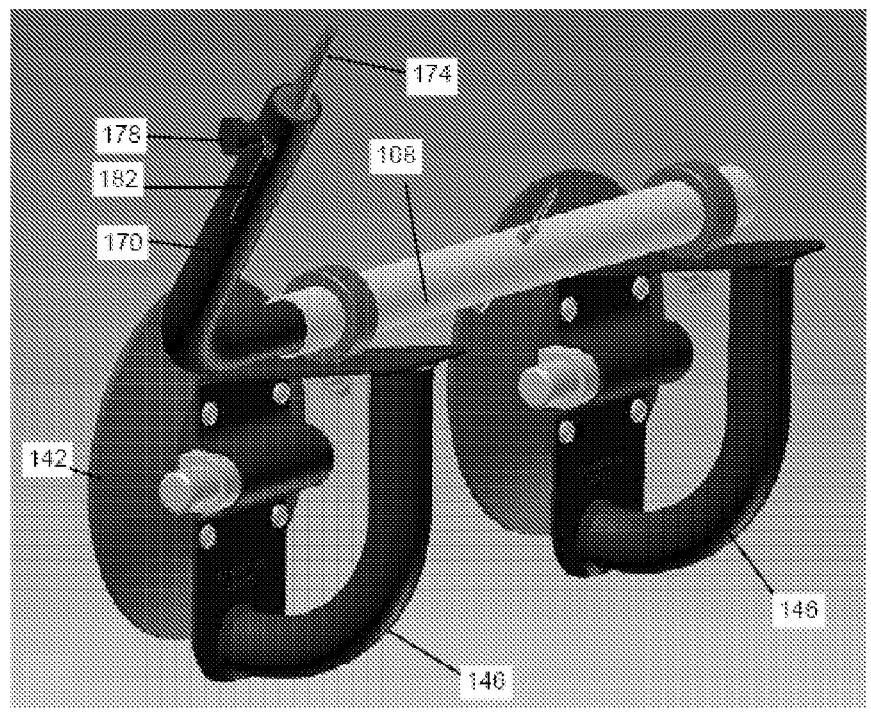
FIG. 7 is a perspective view of the first assembly illustrated in FIG. 6.
Figure 8:
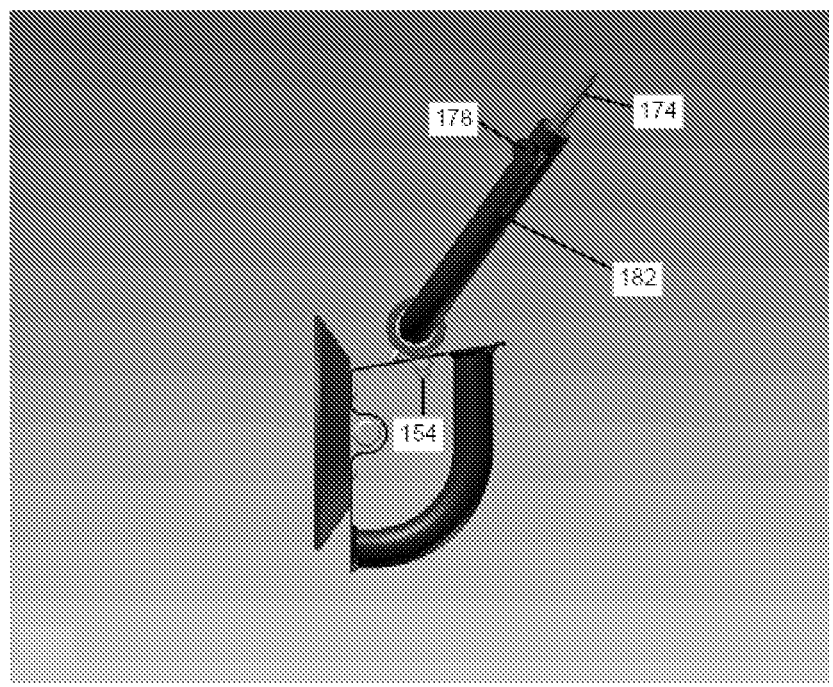
FIG. 8 is a side view of the first assembly illustrated in FIG. 6.

Referring also to FIGS. 3 and 4, the support assembly 48 and the additional suction devices 92 are coupled to the windshield 52, and the pivot assembly 12 is coupled to the side window 14, all by way of manually operating the vacuum devices 34. The pivot assembly 12 is positioned on the side window 14 so that the depending portion 40 extends upwardly and forwardly from the plate 36, adjacent a windshield opening 96. The support rod 80 is moved axially within the support blocks 68 so that the end portion 84 extends past a side edge of the windshield 52. The windshield 52 is manually lifted using the handles 32 of the third and/or fourth suction devices 56, 60 and/or the additional suction devices 92, and the end portion 84 of the support rod 80 is positioned over the cylindrical portion 44 of the pivot member 24. The windshield 52 is thereafter at least partially supported by the pivot member 24 and can be pivoted about the axis 90 of the cylindrical portion 44.

With the support rod 80 engaged with the pivot member 24, the windshield 52 is manipulated from the position illustrated in FIG. 3 into an installation position over the windshield opening 96 as illustrated in FIG. 4. Manipulating the windshield 52 in this manner will generally include pivoting the windshield 52 and the support assembly 48 about the pivot member 24, sliding the support rod 80 axially within the support blocks 68, and also rotating the windshield 52 about the axis 76. The pivotal engagement between the support rod 80 and the pivot assembly 12, along with the sliding and rotating engagement between the support rod 80 and the support blocks 68 movably supports the windshield 52 in such a way that the windshield 52 can be installed by a single technician. More specifically, the technician can first engage the end portion 84 with the pivot member 24, and can then grasp the additional suction devices 92 while walking around the forward portion of the vehicle, thereby pivoting the support rod 80 about the pivot member 24. From the opposite side of the vehicle as the pivot assembly 12, the windshield 52 can be rotated about the axis 76 and moved axially along the support rod 80 until the windshield 52 is properly positioned above the windshield opening 96.

FIGS. 6-14 illustrate a windshield installation device 100 according to one construction of the present invention. The device 100 includes a first assembly 104 (illustrated in FIGS. 6-9) that attaches to a side window (e.g., the passenger side window or driver side window) 14 of a vehicle. With reference to FIGS. 6-9, the first assembly 104 includes a first tubular member 108 connected to a first suction device 110 and a second suction device 114. The first tubular member 108 can include two collars 118, 122 coupled to an exterior surface of the tubular member 108 such that the tubular member 108 is connected to the first suction device 110 and second suction device 114 through the first collar 118 and the second collar 122, respectively. The first tubular member 108 also includes an aperture 126 adapted to receive a quick release pin 130. The first tubular member 108 also includes a first end 134 and a second end 138.

The first suction member 110 and the second suction device 114 each include a resilient cup 142, a handle 146 coupled to the cup 142, and a manually actuated vacuum device 150 that removes air from between the cup 142 and a surface to which the suction device is being attached (e.g., a side window 14 of the vehicle). The construction of the suction devices 110, 114 and the vacuum device 150 are more fully described in commonly assigned U.S. Pat. No. 5,772,823, the contents of which are incorporated by reference herein.

The tubular member 108 is connected to a portion of the handle 146 of both the first suction device 110 and the second suction device 114 with a connector 154. The connector 154 illustrated in the figures is a nut and a bolt, however other suitable connectors may be utilized to connect the tubular member 108 to the first suction device 110 and the second suction device 114. The tubular member 108 can be connected to the first suction device 110 and the second suction device 114 through additional supporting structure as well. Similarly, additional connection points between the tubular member 108 and the first suction device 110 and the second suction device 114 may be implemented.

Figure 9:
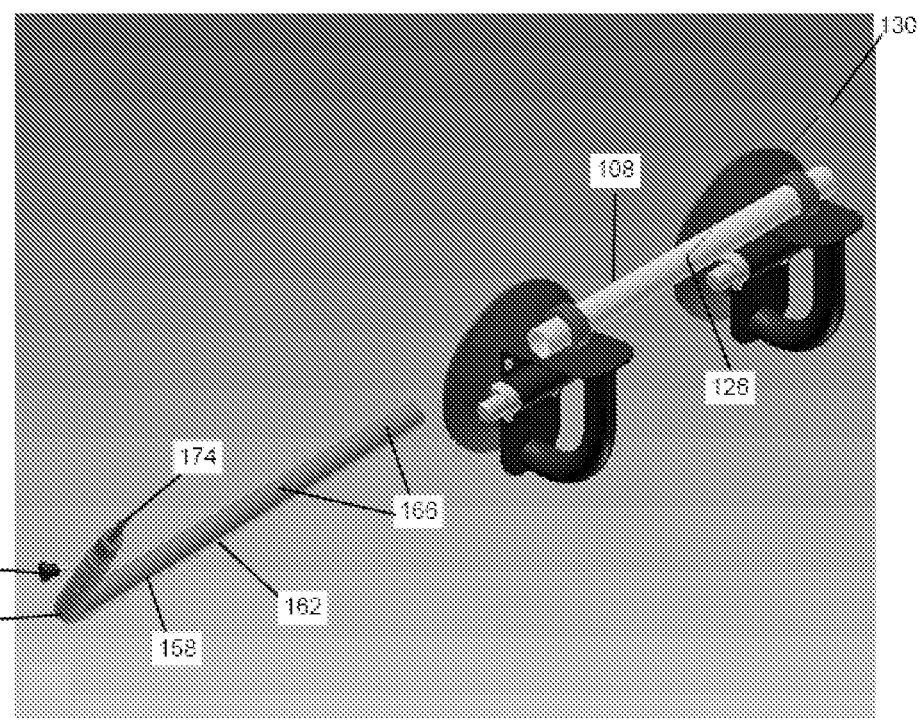
FIG. 9 is an exploded view of the first assembly illustrated in FIG. 6.
Figure 10:
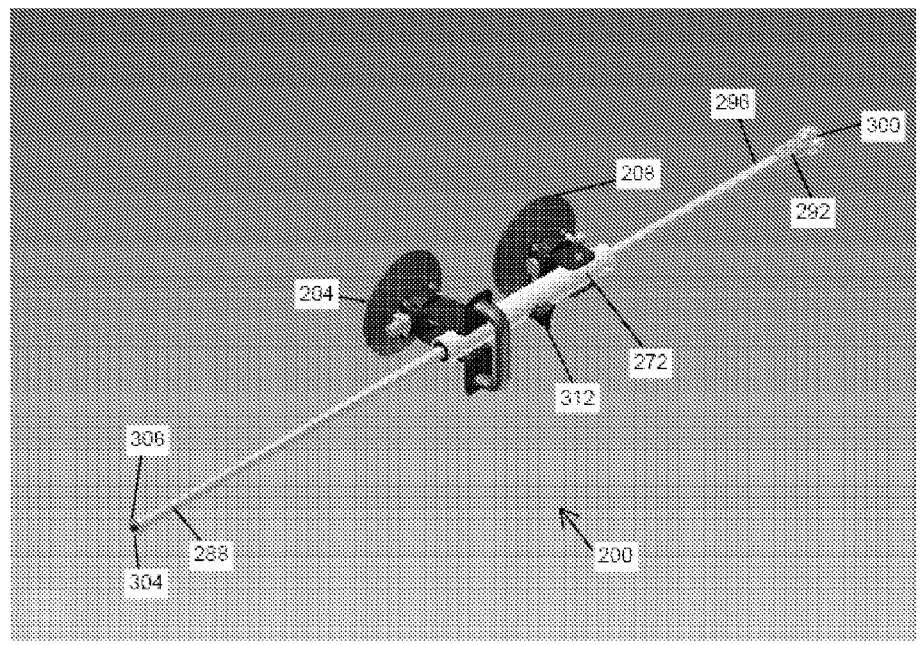
FIG. 10 is a perspective view of a second assembly of a windshield installation device.
Figure 11:
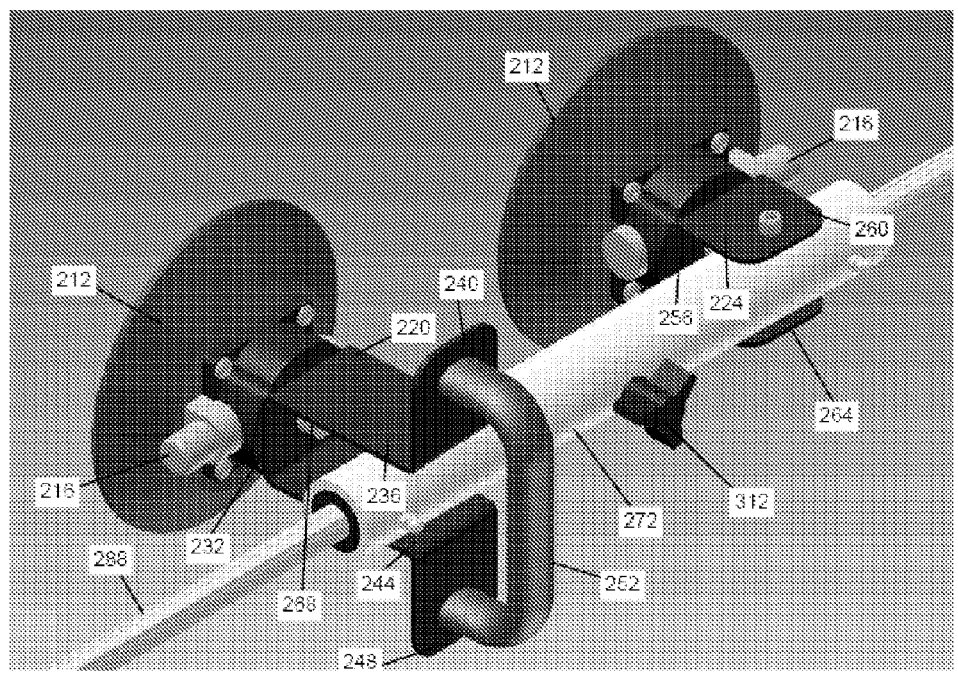
FIG. 11 is an enlarged perspective view of a portion of the second assembly illustrated in FIG. 10.
Figure 12:
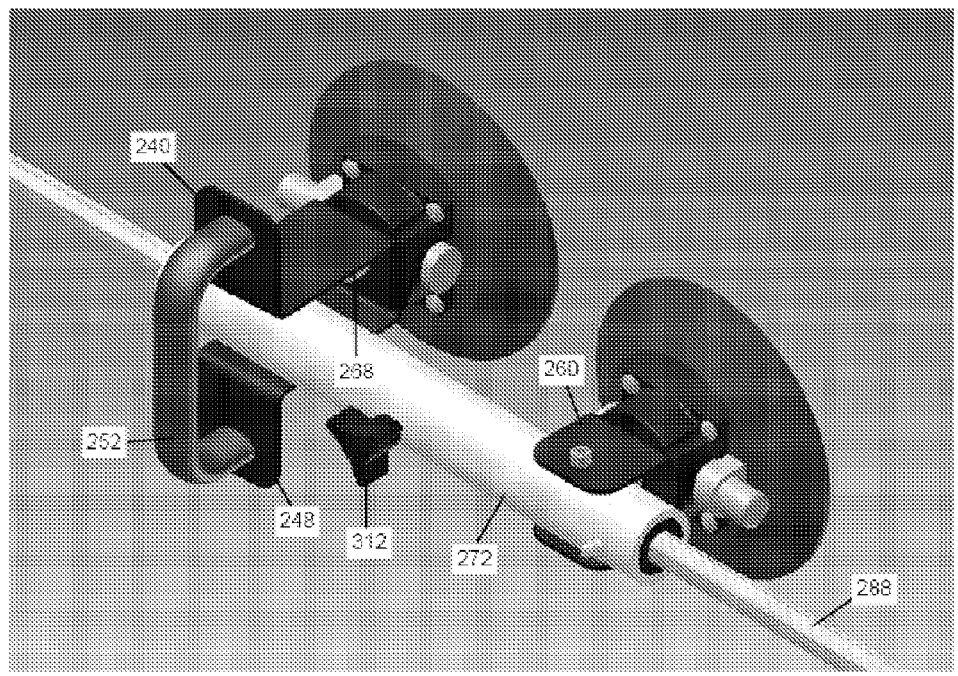
FIG. 12 is an enlarged perspective view of a portion of the second assembly illustrated in FIG. 10.
Figure 13:
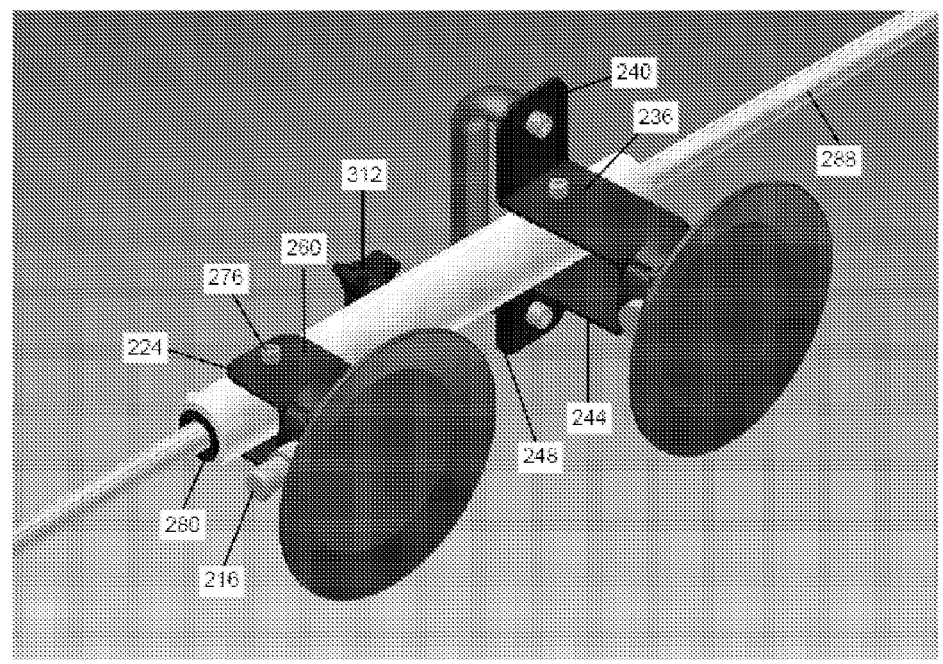
FIG. 13 is a rear perspective view of a portion of the second assembly illustrated in FIG. 10.
Figure 14:
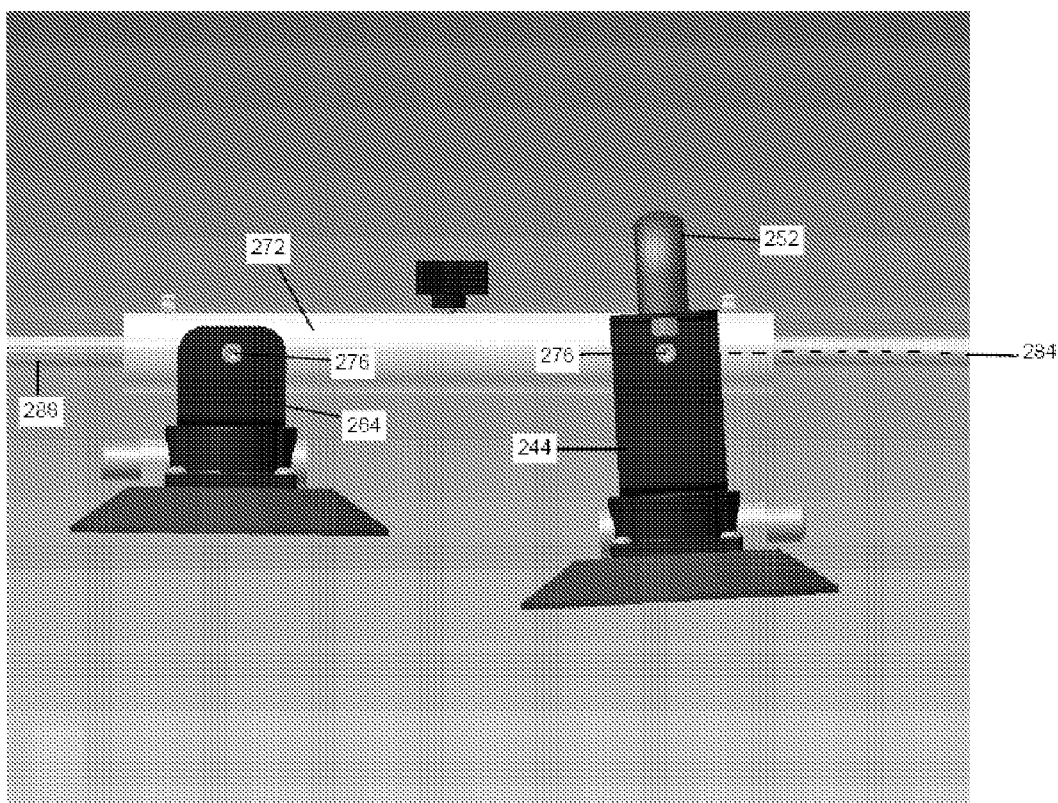
FIG. 14 is a top view of a portion of the second assembly illustrated in FIG. 10.

The first assembly 104 also includes a second tubular member 158 generally L-shaped. The second tubular member 158 includes a diameter less than a diameter of the first tubular member 108. The second tubular member 158 includes a first portion 162 adapted to be received by and slide within the first end 134 or the second end 138 of the first tubular member 108 (to accommodate a driver side or passenger side mounting). The second tubular member 158 includes a plurality of apertures 166 adapted to align with the aperture 126 in the first tubular member 108 and to receive the quick release pin 130. Although two apertures 166 are illustrated in FIG. 9, additional apertures 166 can be implemented in the first tubular member 108 and the second tubular member 158. The second tubular member 158 is adapted to slide within the first tubular member 108 to adjust a position of the second tubular member 158 with respect to the first tubular member 108.

The second tubular member 158 includes a second portion 170 extending substantially perpendicular to the first portion 162. The second tubular member 158 also includes a reduced-diameter cylindrical member 174 coupled to the second portion 170 at a distal end of the second portion 170. The reduced-diameter cylindrical member 174 extends from the distal end of the second portion 170 and is operable to retract inside of the second portion 170 via a peg 178 that slides along a track 182 formed in the second portion 170.

The windshield installation device 100 also includes a second assembly 200 (illustrated in FIGS. 10-14) that attaches to a windshield 52 to be installed in a vehicle. With reference to FIGS. 10-14, the second assembly 200 includes a third suction device 204 and a fourth suction device 208. The third suction device 204 and the fourth suction device 208 each include a resilient cup 212 and a manually actuated vacuum device 216 that removes air from between the cup 212 and a surface to which the suction device is being attached (e.g., a windshield). The construction of the suction devices 204, 208 and the vacuum device 216 are more fully described in commonly assigned U.S. Pat. No. 5,772,823, the contents of which are incorporated by reference herein.

The second assembly 200 also includes a first bracket 220 connected to the third suction device 204 and a second bracket 224 connected to the fourth suction device 208. The first bracket 220 includes a body 232, a first leg 236 extending from the body 232, a first flange 240 extending from an end of the first leg 236, a second leg 244 extending from the body 232, and a second flange 248 extending from an end of the second leg 244. The first flange 240 and the second flange 248 are connected to a handle 252. The second bracket 224 includes a body 256, a first leg 260 extending from the body 256, and a second leg 264 extending from the body 256.

The body 232 of the first bracket 220 is connected to the third suction device 204 with a connector 268. Similarly, the body 256 of the second bracket 224 is connected to the fourth suction device 208 with a connector 268. The connector 268 can be a bolt, however other suitable connectors may be utilized to connect the brackets 220, 224 to the respective suction devices 204, 208.

The second assembly 200 also includes a third tubular member 272 connected to the first and second legs 236, 244 of the first bracket 220 and to the first and second legs 260, 264 of the second bracket 224. The first bracket 220 and the second bracket 224 are connected to the third tubular member 272 with a connector 276, which allows the first and second brackets 220, 224 and corresponding suction devices to pivot with respect to the third tubular member 272 to accommodate different shapes and/or contours of windshields.

The third tubular member 272 defines a bore 280 and an axis 284. The second assembly 200 also includes an elongated rod 288 adapted to slide along the axis 284 on bearings within the bore 280 of the third tubular member 272. The elongated rod 288 also is rotatable about the axis 284. The elongated rod 288 includes a connector 292 secured to a first end 296 that has an opening 300 adapted to receive the reduced-diameter cylindrical member 174 of the first assembly 104. The elongated rod 288 is adapted to pivot with respect to reduced-diameter cylindrical member 174. The elongated rod 288 also includes a flange 304 at a second end 308 that has a diameter greater than a diameter of the bore 280. The third tubular member 272 includes a brake mechanism 312 adapted to slow down movement of the elongated rod 288 through the bore 280. The brake mechanism 312 includes a knob connected to one end of a screw, which has a second end positioned inside of the third tubular member 272 adapted to contact the elongated rod 288 to provide sufficient friction to reduce movement of the elongated rod 288 with respect to the third tubular member 272. The screw can comprise a material softer than the material of the elongated rod 288. For example, brass is a suitable material for the screw to provide sufficient friction and slow movement of the elongated rod 288, which can comprise steel. In other constructions, a rubber pad can be connected to a second end of the screw. The rubber pad is positioned inside of the third tubular member 272 and is adapted to contact the elongated rod 288 to provide sufficient friction to reduce movement of the elongated rod 288 with respect to the third tubular member 272.

Additional suction devices can be coupled to the windshield 52 to facilitate handling of the windshield 52 during windshield installation.

Although the installation devices 10, 100 are shown and described herein as facilitating installation of a windshield in an automotive vehicle, it should be appreciated that the device 10, 100 can be utilized in a variety of other applications in which it is desired to at least partially support an object in a moveable manner to facilitate installation or general manipulation thereof.

Various features of the invention are set forth in the following claims.

What is claimed is:

1. A windshield installation device comprising:
a first assembly including
a suction device,
a first tubular member connected to the suction device, the first tubular member having a first end and a second end, and
a second tubular member having a first portion and a second portion extending substantially perpendicular to the first portion, the first portion positioned within the first end of the first tubular member in a first configuration, the first portion positioned within the second end of the first tubular member in a second configuration,
wherein the suction device is coupled to a first window of a vehicle in the first configuration, and where the suction device is coupled to a second window of the vehicle in the second configuration; and
a second assembly for coupling to a windshield.

2. The windshield installation device as set forth in claim 1 wherein the first assembly further includes a cylindrical member coupled to a distal end of the second portion of the second tubular member, and wherein the second assembly is adapted to couple to the cylindrical member and pivot with respect to the cylindrical member.

3. The windshield installation device as set forth in claim 1 wherein the first assembly further includes a second suction device, and wherein the first tubular member is connected to the second suction device.

4. The windshield installation device as set forth in claim 1 wherein the first tubular member includes an aperture and the first portion of the second tubular member includes an aperture, and wherein the apertures are aligned and adapted to receive a connector.

5. The windshield installation device as set forth in claim 4 wherein the first portion of the second tubular member includes a plurality of axially aligned apertures configured to receive the connector to adjust a length between the second portion of the second tubular member and one of the first end and the second end of the first tubular member.

6. The windshield installation device as set forth in claim 1 wherein the second assembly further includes a suction device for coupling to the windshield.

7. The windshield installation device as set forth in claim 1 wherein the second assembly further includes a third tubular member defining a bore and is connected to the suction device, the second assembly further including an elongated rod adapted to move within the bore.

8. The windshield installation device as set forth in claim 7 wherein the second assembly further includes a bracket having a body, a first leg extending from the body, a first flange extending from the first leg, a second leg extending from the body, and a second flange extending from the second leg, and wherein the body is connected to the suction device, and wherein the first leg and the second leg is connected to the third tubular member, and wherein the first flange and the second flange is connected to a handle.

9. The windshield installation device as set forth in claim 7 wherein the second assembly further includes a second suction device, and wherein the third tubular member is connected to the first suction device and the second suction device.

10. The windshield installation device as set forth in claim 9 wherein at least one of the first suction device and the second suction device is pivotable with respect to the third tubular member.

11. The windshield installation device as set forth in claim 7 wherein the second assembly further includes a brake mechanism adapted to slow movement of the elongated rod within the bore of the third tubular member.

12. A windshield installation device comprising:
a first assembly including
a suction device,
a first tubular member connected to the suction device, and
a second tubular member having a first portion and a second portion extending substantially perpendicular to the first portion, the first portion having a diameter less than a diameter of the first tubular member, the first portion adapted to slide within the first tubular member; and
a second assembly including
a suction device,
a bracket connected to the suction device,
a third tubular member defining a bore and connected to the bracket, the bracket adapted to pivot with respect to the third tubular member, and
an elongated rod positioned and adapted to slide within the bore, wherein the elongated rod is adapted to couple to the second portion of the second tubular member of the first assembly.

13. The windshield installation device as set forth in claim 12 wherein the first assembly further includes a cylindrical member coupled to a distal end of the second portion of the second tubular member, and wherein the second assembly is adapted to couple to the cylindrical member and pivot with respect to the cylindrical member.

14. The windshield installation device as set forth in claim 12 wherein the first assembly further includes a second suction device, and wherein the first tubular member is connected to the second suction device.

15. The windshield installation device as set forth in claim 12 wherein the first tubular member includes an aperture and the first portion of the second tubular member includes an aperture, and wherein the apertures are aligned and adapted to receive a connector.

16. The windshield installation device as set forth in claim 15 wherein the first portion of the second tubular member includes a plurality of axially aligned apertures configured to receive the connector to adjust a length between the second portion of the second tubular member and one of the first end and the second end of the first tubular member.

17. The windshield installation device as set forth in claim 12 wherein the second assembly further includes a second suction device for coupling to the windshield.

18. The windshield installation device as set forth in claim 12 wherein the second assembly further includes a bracket having a body, a first leg extending from the body, a first flange extending from the first leg, a second leg extending from the body, and a second flange extending from the second leg, and wherein the body is connected to the suction device, and wherein the first leg and the second leg is connected to the third tubular member, and wherein the first flange and the second flange is connected to a handle.

19. The windshield installation device as set forth in claim 12 wherein the second assembly further includes a second suction device, and wherein the third tubular member is connected to the first suction device and the second suction device.

20. The windshield installation device as set forth in claim 12 wherein the second assembly further includes a brake mechanism adapted to slow movement of the elongated rod within the bore of the third tubular member.

21. A method of installing a windshield on a vehicle, the vehicle including a windshield opening and a side window, the method comprising:
attaching a first assembly to the side window, the first assembly including a suction device, a first tubular member coupled to the suction device, and a substantially L-shaped second tubular member adapted to slide within the first tubular member;
attaching a second assembly to the windshield, the second assembly including a second suction device, a third tubular member coupled to the second suction device, and a rod supported by the third tubular member;
positioning the rod on the L-shaped second tubular member;
positioning the windshield adjacent the windshield opening; and
securing the windshield to the windshield opening.

22. The method as set forth in claim 21 wherein positioning the windshield adjacent the windshield opening further comprising swinging the windshield over a front portion of the vehicle.

* * * * *

UNITED STATES PATENT AND TRADEMARK OFFICE
CERTIFICATE OF CORRECTION

PATENT NO. : 8,672,309 B2  
APPLICATION NO. : 12/989358  
DATED : March 18, 2014  
INVENTOR(S) : Birkhauser et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 549 days.

Signed and Sealed this

Twenty-ninth Day of September, 2015

Michelle K. Lee
*Director of the United States Patent and Trademark Office*